United States Patent [19]

Lehner et al.

[11] Patent Number: 4,568,612

[45] Date of Patent: Feb. 4, 1986

[54] MAGNETIC RECORDING MEDIA

[75] Inventors: August Lehner, Roedersheim-Gronau; Werner Balz, Limburgerhof; Werner Lenz, Bad Durkheim; Helmut Kopke, Weisenheim; Rudolf Bachmann, Frankenthal; Milan Velic; Milena Melzer, both of Ludwigshafen; Heinrich Hartmann, Limburgerhof; Reinhold Baur, Offenburg, all of Fed. Rep. of Germany

[73] Assignee: BASF Aktiengesellschaft, Fed. Rep. of Germany

[21] Appl. No.: 515,464

[22] Filed: Jul. 20, 1983

[30] Foreign Application Priority Data

Jul. 21, 1982 [DE] Fed. Rep. of Germany ....... 3227164

[51] Int. Cl.$^4$ ................................................. G11B 5/70
[52] U.S. Cl. .................................. 428/425.9; 360/134; 360/135; 360/136; 252/62.54; 427/128; 428/694; 428/900
[58] Field of Search .................... 428/900, 425.9, 694; 427/128; 252/62.54; 360/134–136

[56] References Cited

U.S. PATENT DOCUMENTS

| 2,871,218 | 1/1959 | Schollenberger | 528/76 |
|---|---|---|---|
| 2,899,411 | 8/1959 | Schollenberger | 260/77.5 |
| 3,149,995 | 9/1964 | Bauer | 428/694 |
| 3,150,995 | 9/1964 | Bauer | 428/694 |
| 3,247,017 | 4/1966 | Eichler | 428/694 |
| 3,320,090 | 5/1967 | Graubert | 428/694 |
| 3,558,353 | 1/1971 | Harada | 428/694 |
| 4,058,646 | 11/1977 | Vaeth | 428/694 |
| 4,320,171 | 3/1982 | Motz | 428/423.1 |
| 4,324,438 | 11/1980 | Horigome | 252/62.54 |
| 4,328,282 | 5/1982 | Lehner | 428/694 |
| 4,368,238 | 1/1983 | Somezawa | 428/694 |

FOREIGN PATENT DOCUMENTS 814225 7/1949 Fed. Rep. of Germany .

Primary Examiner—Ellis P. Robinson
Attorney, Agent, or Firm—Keil & Weinkauf

[57] ABSTRACT

Magnetic recording media comprise a non-magnetic base which is provided with a magnetic layer which consists of a dispersion of an anisotropic magnetic material in an organic binder which consists essentially of an OH-containing polyurea-urethane binder crosslinked with polyisocyanate. The OH-containing polyurea-urethane is obtained by reacting a polydiol, a diol and a primary or secondary aminoalcohol, and if appropriate a triol, with a diisocyanate.

9 Claims, No Drawings

MAGNETIC RECORDING MEDIA

The present invention relates to magnetic recording media which comprise a non-magnetic base which is provided with a magnetic layer consisting of finely divided anisotropic magnetic material dispersed in a binder, wherein the binder is an OH-containing polyurethane crosslinked with a polyisocyanate.

Magnetic recording media are used for the recording and playback of audio and video signals and data. The constantly increasing demands made on these recording media call for further improvements in their magnetic and electroacoustic properties. For example, the trend toward higher recording densities in the case of all the said fields of application makes the production of thinner magnetic layers necessary. For this reason, the packing density of the magnetic material in the magnetic layer and the remanence in the recording direction must be considerably increased, and the distribution of the magnetic material in the layer, and the surface smoothness and homogeneity of the layer must be greatly improved, since the faithful recording of signals makes great demands on the quality of a magnetic layer. A magnetic layer must be capable of recording and reproducing both high- and low-frequency signals without any variation in their amplitude.

In order to achieve these properties, it is necessary not only that the magnetic pigment should be distributed very uniformly in the organic binder, but also that the magnetic layer should be magnetically very sensitive in the recording direction. The anisotropy of the acicular pigment particles is utilized to achieve a high orientation ratio. The liquid dispersion comprising the magnetic pigment and the organic binder solution is applied as a coating to an inert base and is then exposed to a magnetic field, so that the magnetizable needles are oriented in the recording direction. This procedure is followed directly by a drying operation, in which the particles in the binder are locked in their oriented positions. A measure of the degree of particle orientation achieved, and hence of the sensitivity of the recording medium, is the ratio of the residual induction $B_R$ to the saturation induction $B_S$ of the dry magnetic layer, measured in the recording direction.

The distribution of the magnetic particles in the organic binder and their orientation by the magnetic field are effected by the nature of the polymer employed, the effect being particularly pronounced when a finely divided pigment is used. There is a wide choice of organic binders, and combinations thereof, for magnetic powders. Examples of conventional binders include polyacrylates, nylons, polyesters, polyurethanes, phenoxy resins, vinyl chloride/acrylonitrile copolymers and copolymers of vinyl chloride, vinyl acetate and vinyl alcohol. The majority of the polymers listed are relatively hard and brittle, whereas the usual mechanical stressing of the magnetic layer requires an elastomeric, frequently relatively soft, formulation. Therefore, polyurethane elastomers are frequently combined with relatively brittle polymers, such as phenoxy resins, vinyl chloride/vinyl acetate copolymers, polycarbonates, etc., or plasticizers are introduced into the layer. Such polyurethanes are prepared by reacting hydroxyl-containing polyethers or polyesters with polyisocyanates. Usually, polyester-urethane elastomers as described in, for example, German Published Application DAS No. 1,106,959, or polyether-urethane elastomers as described in U.S. Pat. No. 2,899,411, are employed. To improve the tape running properties, the above polymer mixtures are frequently crosslinked with polyisocyanates. Hence, the hard resins employed also frequently possess OH groups.

However, the disadvantages of using these binder systems are the high solvent demand, the long dispersing time and the 2-stage dispersing procedure required. Furthermore, the particular properties of the magnetic materials are not satisfactorily displayed in these binder systems. This is evident from the fact that the resulting recording media have a low orientation ratio, low remanence and hence poor sensitivity at short and long wavelengths, and an unsatisfactory maximum output level.

German Pat. No. 814,225 describes the use of bifunctional or higher functional polyoxy compounds, preferably polyesters, which still possess hydroxyl groups, in combination with polyisocyanates. The substances mentioned in that publication, however, do not form films but are low molecular weight products and hence tend to block before they have reacted completely.

To overcome the disadvantages of German Pat. No. 814,225, German Published Application DAS No. 1,130,612 proposes mixing 5-25% of a high-polymeric physically drying surface coating binder with the polyester-polyisocyanate binder. However, the process has the disadvantage that an additional binder component ist required, with the result that the preparation process is lengthened by a further step. Moreover, a 2-stage milling operation is required in order to achieve optimum properties. German Published Application DAS No. 1,283,282 is similar to German Published Application DAS No. 1,130,612, except that in the former rubber is added to the polyester-urethane binder.

In German Published Application DAS No. 1,571,128, the binder contains from 0 to 75 percent by weight of a polymeric matrix material, the remainder being an elastomer. The polymeric matrix material used comprises one or more copolymers selected from a group consisting of soluble hydroxyl-containing resins having a molecular weight of not less than 2,000.

In choosing the conventional binder systems, it was the object in each case to overcome or at least mitigate disadvantages and deficiencies, such as long dispersing time, two-stage dispersing procedure, poor pigment wetting, high solvent demand during the production of the dispersion, low orientation ratio, poor sensitivity at short and long wavelengths, low maximum output level at long and short wavelengths and inadequate signal-to-print-through ratio of the recording layers. With regard to obtaining optimum properties, the solutions proposed hitherto are either inadequate or successful in only some cases.

It is an object of the present invention to provide magnetic recording media which possess improved electroacoustic properties, in particular with regard to sensitivity and maximum output level at long and short wavelengths, as a result of the use of suitable binders which permit the magnetic material to be dispersed in a smaller amount of solvent in a short time by one-stage procedure.

We have found that this object is achieved, and that magnetic recording media which comprise a magnetic layer which is applied to a non-magnetic base and consists of a dispersion of an anisotropic magnetic material in an organic binder consisting essentially of an OH-containing polyurethane binder crosslinked with a polyisocyanate satisfy the requirements set, if the polyurethane is a thermoplastic polyurea-urethane which has an OH number of from 10 to 120 and is obtained from IA. 1 mole of a polydiol having a molecular weight of from 400 to 4,000, IB. from 0.2 to 10 moles of a diol of 2 to 18 carbon atoms, IC. from 0.1 to 4 moles of a primary or secondary aminoalcohol of 2 to 20 carbon atoms, and II. from 1.20 to 13 moles of a diisocyanate of 6 to 30 carbon atoms, the proportion of NCO groups in the diisocyanate being from 65 to 95%, based on Components IA to IC, of the equivalent amount of OH and NH groups, with the proviso that the non-pigmented crosslinked film has a tensile strength greater than 15 N/mm², an elongation at break greater than 30%, a modulus of elasticity greater than 150 N/mm² and a pendulum hardness of from 25 to 140 sec.

Equally suitable for the purpose of the invention are similar binders obtained from IA. 1 mole of a polydiol having a molecular weight of from 400 to 4,000, IB. from 0.2 to 9 moles of a diol of 2 to 18 carbon atoms, IC. from 0.1 to 4 moles of a primary or secondary aminoalcohol of 2 to 20 carbon atoms, ID. from 0.01 to 1 mole of a triol of 3 to 18 carbon atoms, and II. from 1.25 to 13 moles of a diisocyanate of 6 to 30 carbon atoms, the proportion of NCO groups in the diisocyanate being from 65 to 95%, based on Components IA to ID, of the equivalent amount of OH and NH groups.

The OH-containing polyurea-urethane binders which are crosslinked with the polyisocyanates and can be used for the novel recording media possess, as non-pigmented films, a tensile strength (according to DIN 53,455) greater than 15, preferably greater than 25, N/mm², an elongation at break (according to DIN 53,455) greater than 30%, preferably greater than 50%, a modulus of elasticity (according to DIN 53,457) greater than 150, preferably greater than 200, N/mm², and a pendulum hardness (according to DIN 53,157) of from 25 to 140, preferably from 40 to 110 sec.

The OH-containing polyurea-urethane binders used according to the invention are thermoplastic polyurea-urethanes having an OH number of from 10 to 120, preferably from 20 to 100, and a number average molecular weight of from 1,000 to 40,000. In the structure of these polymers, it has proved advantageous if some of the OH terminal groups, preferably more than 70%, in particular more than 90%, are present in the radicals:

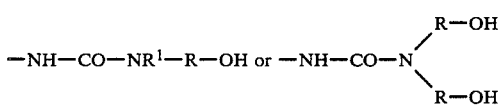

where R is $-(CH_2)-_n$, $R^1$ is H, $-CH_3$ or $-(CH_2-)_n-CH_3$ and n is from 1 to 10.

Polymers having this structure are less thermoplastic than those without these terminal groups. Moreover, such a structure permits an increase in the content of terminal OH groups, with the result that when crosslinking with the polyisocyanate is effected, the degree of crosslinking can be varied within wide limits, according to the demands made on the magnetic layer. The urea groups, which increase the dispersibility of conventional magnetic materials, are also of advantage.

To prepare these polymers, a polydiol having a molecular weight of from 400 to 4,000, preferably from 700 to 2,500, is employed as Component IA, suitable compounds being the conventional polyesterols, polyetherols, polycarbonates and polycaprolactones.

Advantageously, the polyesterols are predominantly linear polymers which have terminal OH groups, preferably 2 such groups, and an acid number of less than 10, preferably less than 3. The polyesterols can be obtained in a simple manner by esterifying an aliphatic dicarboxylic acid of 4 to 12, preferably 4 to 6, carbon atoms with an aliphatic glycol, preferably one of 2 to 12 carbon atoms, or by polymerizing lactones of 3 to 6 carbon atoms. Examples of suitable aliphatic dicarboxylic acids are glutaric acid, pimelic acid, suberic acid, sebacic acid, dodecanedioic acid and preferably adipic acid and succinic acid. The dicarboxylic acids can be used individually or as a mixture. In preparing the polyesterols, it may be advantageous to replace the dicarboxylic acids with the corresponding acid derivatives, such as a carboxylic acid ester where the alcohol radical is of 1 to 4 carbon atoms, a carboxylic anhydride or a carboxylic acid chloride. Examples of suitable glycols are diethylene glycol, pentane-1,5-diol, decane-1,10-diol and 2,2,4-trimethylpentane-1,5-diol, but ethane-1,2-diol, butane-1,4-diol, hexane-1,6-diol and 2,2-dimethylpropane-1,3-diol are preferably used. Depending on the desired properties of the polyurethanes, the polyols can be used either alone or mixed together in various proportions. Suitable lactones for the preparation of the polyesterols are α,α-dimethyl-β-propiolactone, γ-butyrolactone and preferably ε-caprolactone.

The polyetherols are essentially linear substances which possess ether bonds and terminal hydroxyl groups and have a molecular weight of about 600–4,000, preferably 1,000–2,000. Suitable polyetherols can be readily prepared by polymerizing a cyclic ether, eg. tetrahydrofuran, or by reacting one or more alkylene oxides, where alkylene is of 2 to 4 carbon atoms, with an initiator whose molecule contains two bonded active hydrogen atoms. Examples of alkylene oxides are ethylene oxide, 1,2-propylene oxide, epichlorohydrin, 1,2-butylene oxide and 2,3-butylene oxide. The alkylene oxides can be used individually, in succession or as a mixture. Examples of suitable initiators are water, glycols, eg. ethylene glycol, propylene glycol, butane-1,4-diol and hexane-1,6-diol, amines, eg. ethylenediamine, hexamethylenediamine and 4,4'-diaminodiphenylmethane, and aminoalcohols, eg. ethanolamine. Like the polyesterols, the polyetherols, too, can be used either alone or as a mixture.

Diols of 2 to 18, preferably 2 to 6, carbon atoms, eg. ethane-1,2-diol, propane-1,3-diol, butane-1,4-diol, hexane-1,6-diol, pentane-1,5-diol, decane-1,10-diol, 2-methylpropane-1,3-diol, 2,2-dimethylpropane-1,3-diol, 2,2-dimethylbutane-1,4-diol, 2-methyl-2-butylpropane-1,3-diol, neopentylglycol hydroxypivalate, diethylene glycol, triethylene glycol and methyldiethanolamine, are employed as Component IB.

In order to obtain novel recording media possessing special properties, it is advantageous if, in the preparation of the OH-containing polyurea-urethane, Component IB consists completely or partially of a diamine of 2 to 15 carbon atoms, eg. ethylenediamine, hexamethylene-1,6-diamine, 4,9-dioxadodecane-1,12-diamine or 4,4'-diaminodiphenylmethane, or an aminoalcohol, eg.

monoethanolamine, monoisopropanolamine or 4-methyl-4-aminopentan-2-ol.

Similarly, the diol used as Component IB may furthermore be completely or partially replaced by water or by the primary or secondary aminoalcohols listed below for Component IC.

These aminoalcohols (Component IC) of 2 to 20, preferably 3 to 6, carbon atoms, include monoethanolamine, diethanolamine, monoisopropanolamine, diisopropanolamine, methylisopropanolamine, ethylisopropanolamine, methylethanolamine, 3-aminopropanol, 1-ethylaminobutan-2-ol, 4-methyl-4-aminopentan-2-ol and N-(2-hydroxyethyl)-aniline. Secondary aminoalcohols are particularly suitable since they form an adduct at the chain end and hence improve the solubility of the polymer. Methylethanolamine, diethanolamine and diisopropanolamine have proved particularly advantageous.

The triols used (Component ID) are compounds of 3 to 18, preferably 3 to 6, carbon atoms, examples of appropriate compounds being glycerol, trimethylolpropane and hexanetriol. Low molecular weight reaction products, for example of glycerol or trimethylolpropane with ethylene oxide and/or propylene oxide, are also suitable. The presence of triols during the polyaddition leads to a branched end product; this branching is advantageous for the mechanical properties of the polyurethane, provided that localized crosslinking does not take place.

For the formation of the OH-containing polyureaurethanes, the components listed under I are reacted with an aliphatic, cycloaliphatic or aromatic diisocyanate of 6 to 30 carbon atoms (Component II). Particularly suitable compounds for this purpose are toluylene 2,4-diisocyanate, toluylene 2,6-diisocyanate, m-phenylene diisocyanate, 4-chlorophenylene 1,3-diisocyanate, naphthylene 1,5-diisocyanate, hexamethylene 1,6-diisocyanate, cyclohexylene, 1,4-diisocyanate, tetrahydronaphthylene 1,5-diisocyanate, diphenylmethane diisocyanate, dicyclohexylmethane diisocyanate and isophorone diisocyanate. The OH-containing polyurethanes based on toluylene diisocyanate and isophorone diisocyanate are readily soluble in tetrahydrofuran and dioxane. Mixtures of diisocyanates, eg. of toluylene diisocyanate with diphenylmethane diisocyanate, are also advantageous.

Components I and II are employed in the following ratio: from 1.20 to 13 moles of diisocyanate, from 0.2 to 10, preferably from 0.5 to 5, moles of the straight-chain aliphatic diol of 2 to 18 carbon atoms and, if appropriate, from 0.01 to 1, preferably from 0.15 to 0.5, mole of triol can be employed per mole of polydiol. The amount of straight-chain diol used depends partly on the molecular weight of the polydiol employed. The isocyanate should be present in an amount which is 5–35% less than the stoichiometric amount, based on the amounts of NH-containing or hydroxyl-containing compounds, so that at the end of the reaction there is virtually no free, unreacted isocyanate present, while free, unreacted hydroxyl groups remain. However, for practical reasons it is often advantageous, in a preliminary reaction of Components IA, IB, ID and II, to use an excess of diisocyanate of from 5 to 40%, preferably from 10 to 30%, based on the amount required for complete conversion of the reactants, so that the ratio of the number of hydroxyl groups employed to the number of isocyanate groups in this reaction stage is from about 1:1.05 to 1:1.4, preferably from about 1:1.1 to 1:1.30. In the second reaction stage, Component IC is then added in an amount such that the number of NH equivalents corresponds to the NCO content, ie. from 0.1 to 4, preferably from 0.3 to 2.5, moles per mole of Component IA, or the NCO-containing prepolymer is added to the aminoalcohol, so that the amino groups react with the isocyanate. Even in the case of polyurethanes which do not contain triols, variation of the aminoalcohols gives products having an OH functionality of from 2 to 4, the OH groups being predominantly at the chain ends. If the polyurethanes used contain triols, the OH functionality is increased accordingly. This composition is of advantage for film formation and for the final crosslinking of the OH-containing polyurethane with the polyisocyanate. If, in this second reaction stage, the NCO groups are slightly in excess of the NH or $NH_2$ groups, some of the aminoalcohol is incorporated into the molecule and results in a branching point, depending on the aminoalcohol. If an excess of NH groups is used, the aminoalcohol is not completely incorporated into the polymer until the crosslinking reaction has taken place. Hence, by varying the terminal groups, it is possible to match the polymer to the particular requirements, eg. film-forming ability and dispersibility.

The thermoplastic elastomeric OH-containing polyurea-urethanes having the above composition are preferably prepared by a 2-stage process, in solution, in the presence or absence of a catalyst and other assistants and/or additives. It is also possible to prepare these products by the solvent-free batch process. However, because of the possible presence of a triol and the reaction of the amine with NCO groups, gel particles are formed to at least some extent during polyaddition in the absence of a solvent, and the reaction is therefore carried out in general in solution. The risk of complete crosslinking occuring locally, as happens in the case of polyaddition in the absence of a solvent, is usually avoided in the polyaddition in solution.

Preferably used solvents for the preparation of the polyurethanes are cyclic ethers, eg. tetrahydrofuran and dioxane, and cyclic ketones, eg. cyclohexanone. Depending on the field of use, the polyurethanes can of course also be dissolved in another strongly polar solvent, such as dimethylformamide, N-methylpyrrolidone, dimethyl sulfoxide or ethylglycol acetate. It is also possible to mix the above solvents with aromatics, eg. toluene or xylene, or esters, eg. ethyl or butyl acetate.

Examples of suitable catalysts for the preparation of the polyurethane and for the crosslinking reaction are tert.-amines, eg. triethylamine, triethylenediamine, N-methylpyridine and N-methylmorpholine, metal salts, eg. tin octoate, lead octoate and zinc stearate, and organometallic compounds, eg. dibutyl-tin dilaurate. The amount of catalyst to be employed depends on its activity. In general, it has proved advantageous to use from 0.005 to 0.3, preferably from 0.01 to 0.1, parts by weight per 100 parts by weight of polyurethane.

In the 2-stage polyaddition process, the diisocyanate is placed first in the reactor, and Components IA, IB and ID, with or without a catalyst, assistants and additives, in a solvent, are then added at from 20° to 90° C., preferably from 30° to 70° C., in the course of from 0.5 to 5 hours. The components are then allowed to react until the desired NCO content is reached, after which Component IC is added in the 2nd stage, or Component IC is initially introduced and the polymer is then added.

In the 2-stage process, the first stage is carried out using an NCO excess, based on Components IA, IB and ID.

The processing of the solution of the OH-containing polyurea-urethane binder with magnetic materials and assistants into a magnetic dispersion, and the application thereof to the base material to give the magnetic recording medium may be carried out in a conventional manner.

The anisotropic magnetic materials which can be used are the conventional ones, but the choice of pigment is a factor which substantially determines the properties of the resulting magnetic layer. Examples of these materials are gamma-iron(III) oxide, finely divided magnetite, non-doped ferromagnetic chromium dioxide or cobalt-modified gamma-iron(III) oxide.

Acicular gamma-iron(III) oxide and ferromagnetic chromium dioxide are preferred. The particle size is in general from 0.2 to 2 $\mu$m, preferably from 0.3 to 0.8 $\mu$m.

As is conventionally the case, the magnetic layer may also contain small amounts of additives, eg. dispersants and/or lubricants, and fillers, which are admixed during dispersion of the magnetic pigment or during the production of the magnetic layer. Examples of such additives are fatty acids or isomerized fatty acids, eg. stearic acid, or their salts with metals of main groups I to IV of the periodic table of elements, amphoteric electrolytes, eg. lecithin, and fatty acid esters, waxes, silicone oils, conductive carbon, etc. The additives are used in a conventional amount, which is in general less than 10 percent by weight, based on the magnetic layer.

The said OH-containing polyurea-urethane binders are generally used alone for the production of the magnetic layers, and they permit very short dispersing times. They can be crosslinked using a large number of organic di-, tri- or polyisocyanates or isocyanate prepolymers having a molecular weight of not more than 10,000, preferably from 500 to 3,000. Preferred compounds are polyisocyanates which possess more than 2 NCO groups per molecule. Polyisocyanates which are based on toluylene diisocyanate, hexamethylene diisocyanate or isophorone diisocyanate and are obtained by polyaddition to diols and triols or by biuret and isocyanurate formation have proved particularly suitable. An adduct of toluylene diisocyanate with trimethylolpropane and diethylene glycol is particularly advantageous.

Depending on the properties which the recording material is required to have, the amount of polyisocyanate component added can vary from as much as 70%, preferably as much as 50%, less than the stoichiometric amount to an excess of not more than 100%, preferably not more than 50%, the percentages being based on the OH groups of the polyurethane binder to be crosslinked.

However, when magnetic recording media according to the invention are to be used for special purposes, it may be advantageous to add a second binder component in an amount of from 10 to 50, preferably from 20 to 40, parts by weight, based on the resulting total amount of binder. Particularly suitable further binders are vinyl chloride polymers which are substantially compatible with the polyurethane binder, phenoxy resins, preferably those polycondensates obtained from epichlorohydrin and bisphenol A, and polyvinylformal binders or high molecular weight nonreactive polyurethane elastomers as described in, for example, German Published Application DAS No. 1,106,959.

The novel recording material contains from 1 to 10, in particular from 3 to 6, parts by weight of magnetic material per part by weight of binder or binder mixture. A particular advantage is the fact that the excellent pigment-binding ability of the special polyurethanes permits a high loading of magnetic material in the magnetic layer without the mechanical properties being adversely affected or the service characteristics being noticeably affected.

The non-magnetic and non-magnetizable bases used are conventional rigid or flexible ones, in particular films obtained from linear polyesters, eg. polyethylene terephthalate, which are in general from 4 to 200, in particular from 10 to 36, $\mu$m thick. More recently, the use of magnetic layers on paper bases for electronic computing and accounting machines has become important; the novel coating materials can be advantageously used for this purpose, too.

The magnetic recording medium according to the invention can be produced in a conventional manner. Advantageously, a magnetic dispersion is produced in a dispersing apparatus, eg. a tubular ball mill or a stirred ball mill, from the magnetic material and a solution of the binder or binders, with the addition of dispersants and other additives, the polyisocyanate crosslinking agent is mixed in, and the dispersion is filtered and then applied to the non-magnetic base using a conventional coating apparatus, eg. a knife coater. As a rule, the magnetic particles are oriented before the fluid coating mixture has dried on the base; drying is advantageously carried out at from 50° to 90° C. for from 2 to 5 minutes. The magnetic layers can be subjected to a conventional surface treatment, eg. calendering in which the coated base is passed between polished rollers, with the application of pressure and optional heating at from 25° to 100° C., preferably from 60° to 80° C. It has proved very advantageous to carry out calendering before crosslinking is complete, since the OH polymers in the non-crosslinked state are very thermoplastic but do not exhibit tackiness. The thickness of the magnetic layer is in general from 2 to 20, preferably from 4 to 10, $\mu$m. Where magnetic tapes are to be produced, the coated webs are slit, in the longitudinal direction, to the usual widths.

Compared with magnetic recording media obtained using, as binders, prior art polyurethanes or polyurethane mixtures with suitable harder surface coating resin components, the magnetic recording media according to the invention possess improved electroacoustic properties, in particular a higher maximum output level at short and long wavelengths as well as higher sensitivity. Another big advantage is that it is possible with the OH-containing polyurea-urethane to process conventional magnetic materials into homogeneous, highly pigmented dispersions in conventional dispersing apparatus, the operation being easy to carry out and, in particular, requiring very little time and energy. The fact that up to 40% less solvent is required in the dispersing operation should also be singled out. A further advantage is that the crosslinking of the polymers suitable for the novel magnetic recording media results in magnetic layers which are stable even at elevated temperatures and high humidity levels.

In the Examples and Comparative Experiments which follow, parts and percentages are by weight, unless stated otherwise. Parts by volume bear the same relation to parts by weight as the liter to the kilogram.

EXAMPLE A

A solution of 150 g of a polyester having a molecular weight of 1,000 and obtained from adipic acid and butane-1,4-diol, 31.8 g of diethylene glycol, 4.47 g of trimethylolpropane and 200 g of tetrahydrofuran was added dropwise to a solution containing 108.75 g of toluylene diisocyanate (isomer ratio 8:2) and 114 g of tetrahydrofuran in the course of 2 hours at 60° C. 1 drop of dibutyl-tin dilaurate was added before the beginning of the addition, and a further drop 1 hour after the addition was complete. The solution was stirred at 60° C. until the NCO content was 1.72%, after which it was cooled to 45° C. and 18.78 g of methylethanolamine were added.

The resulting product had a solids content of 50%, an OH number of 45 and a K value of from 22 to 24.

EXAMPLE 1

1,000 g of a Co-doped iron oxide pigment having a coercive force of 30 kA/m, 1,130 g of a solvent mixture of equal amounts of tetrahydrofuran and dioxane, 35 g of a dispersant based on a mixture of a monophosphate with the salt of a sulfosuccinic acid, 335 g of a 50% strength solution, in tetrahydrofuran, of the hydroxyl-containing polyurethane solution described in Example A, 1.0 g of a commercial silicone oil, 2.0 g of hydroquinone, 2.0 g of n-butyl stearate and 10 g of isostearic acid were dispersed for 70 hours in a steel ball mill having a capacity of 6 liters and containing 8 kg of steel balls with a diameter of from 4 to 6 mm. The resulting dispersion was then forced under pressure through a filter having 5 μm pores, 26.0 g of a 75% strength solution, in ethyl acetate, of a triisocyanate obtained from 3 moles of toluylene diisocyanate and 1 mole of trimethylolpropane were added while stirring vigorously, and immediately afterward the dispersion was applied to a 12 μm thick polyethylene terephthalate film by means of a conventional knife coater. The coated film was passed through a magnetic field to orient the magnetic particles, dried at from 50° to 90° C., passed between heated rollers (70° C.) at a nip pressure of 200 kg/cm to consolidate and smoothen the magnetic layer, and finally slit into 3.81 mm wide tapes. The crosslinking reaction continued during tape production and for a short time afterward.

The magnetic properties were measured in a magnetic field of 160 kA/m. The surface roughness was determined as the average peak-to-vally height $R_z$ according to DIN 4,768, Sheet 1. The electroacoustic properties were measured in accordance with DIN 45,401, 45,403 and 45,512 (Sheet 12), against reference tape IEC 1. The results of the measurements are summarized below.

After coating but before calendering:
Average peak-to-valley height $R_z$: 0.40 μm
Remanence: 150 mT
After calendering:
Average peak-to-valley height $R_z$: 0.17 μm
Remanence: 180 mT
Electroacoustic properties (reference tape IEC 1):
Sensitivity at long wavelengths $E_T$ 315 Hz (ΔdB): +1.0
Sensitivity at short wavelengths $E_H$ 10 kHz (ΔdB): +2.5
Maximum output level at long wavelengths $A_T$ 315 Hz (ΔdB): +1.5
Maximum output level at short wavelengths $A_H$ 10 kHz (ΔdB): +1.5
Thickness of magnetic layer: 4.0 μm

EXAMPLE B

A solution of 100.05 g of toluylene diisocyanate in 107 g of tetrahydrofuran was heated at 60° C., and one drop of dibutyl-tin dilaurate was added. 150 g of an OH-containing polyester obtained from adipic acid and butane-1,4-diol and having a molecular weight of 1,000 and 41.3 g of hexanediol, dissolved in 200 g of tetrahydrofuran, were added to the above solution in the course of 2½ hours. After one hour, a further drop of dibutyl-tin dilaurate was added. After the NCO content had reached 1.05%, the mixture was cooled to 45° C. and 15.75 g of diethanolamine were then added. The resulting product had a solids content of 50%, and an OH number of 55 and a K value of 24–28.

EXAMPLE 2

100,000 parts of steel balls, 7,200 parts of a 50% strength solution of the polyurea-urethane described in Example B, 200 parts of a dispersant, 166 parts of a lubricant, 16,000 parts of a ferromagnetic chromium dioxide pigment having a mean particle size of 0.5 μm and a coercive force of 50 kA/m and 18,000 parts of tetrahydrofuran were introduced into a steel ball mill having a capacity of 100,000 parts by volume, and the mixture was dispersed for about 24 hours. The magnetic dispersion was then forced under pressure through a filter having a pore size of 5 μm, 1,140 parts of a 75% strength solution of a triisocyanate obtained from 3 moles of toluylene diisocyanate and 1 mole of trimethylolpropane were added while stirring, and immediately afterward the dispersion was applied to a 15 μm thick polyethylene terephthalate film. The coated film was passed through a magnetic field to orient the magnetic particles, and was then dried at from 60° to 90° C. The magnetic coating was then calendered by passing the coated web between heated rollers (60° C.; nip pressure 200 kg/cm), after which treatment the coating was 4 μm thick. The coated film was then slit into ½ inch wide tapes.

Using a VHS recorder from the Victor Company of Japan, these magnetic recording media intended for the video sector were tested for the following properties against a reference tape (0 dB):

(1) Video signal-to-noise ratio (video S/N): ratio of the luminance signal of a 100% white image to the noise level, measured using the UPSF noise voltage meter from Rohde and Schwarz (>100 kHz).
(2) Color signal-to-noise ratio (color S/N): ratio of the color signal of a red area to the noise level, measured using the UPSF noise voltage meter from Rohde and Schwarz (100 kHz–3 MHz).
(3) Dropouts: The number, per minute, of drops in the level of the output signal of 20 dB lasting more than 15 μsec.

The results of the tests are shown in Table 1.

COMPARATIVE EXPERIMENT

The procedure described in Example 2 was followed, except that the polyurea-urethane described in Example B was replaced by a polyester-urethane prepared as described in German Published Application DAS No. 1,295,011, by the melt condensation method. Tetrahydrofuran was used as the solvent, and the mixture was processed as described in Example 2. The results of the tests are shown in Table 1.

TABLE 1

|  | Video S/N [dB] | Color S/N [dB] | Dropouts/min |
|---|---|---|---|
| Example 2 | 2 | 2 | 15 |
| Comparative experiment | 0 | 0 | 30 |

EXAMPLE C

A solution of 108.75 g of toluylene diisocyanate in 108 g of tetrahydrofuran was heated at 60° C., and one drop of dibutyl-tin dilaurate was added. 150 g of an OH-containing polyester obtained from adipic acid and butane-1,4-diol and having a molecular weight of 1,000 and 18.6 g of ethylene glycol and 4.47 g of trimethylolpropane, dissolved in 200 g of tetrahydrofuran, were added to the above solution in the course of 2½ hours. After one hour, a further drop of dibutyl-tin dilaurate was added. After the NCO content had reached 1.78%, the mixture was cooled to 45° C. and 26.25 g of diethanolamine were then added. The resulting product had a solids content of 50%, and an OH number of 91 and a K value of 24.

EXAMPLE 3

102 kg of tetrahydrofuran, 31 kg of a 50% strength solution of the polyurea-urethane described in Example C, 100 kg of a ferromagnetic chromium dioxide having a mean needle length of 0.5 μm, 2.5 kg of zinc oleate, 0.25 kg of a commercial silicone oil and 1 kg of n-butyl stearate were introduced into a steel ball mill having a capacity of 600 parts by volume and containing 600 kg of steel balls with a diameter of from 4 to 6 mm, and the mixture was dispersed for 36 hours. The dispersion was then filtered under pressure, 0.039 part, per part of dispersion, of a 75% strength solution of a triisocyanate obtained from 3 moles of toluylene diisocyanate and 1 mole of trimethylolpropane was added while stirring, and immediately afterward the dispersion was applied to a 15 μm thick polyethylene terephthalate film. The coated film was passed through a magnetic field to orient the magnetic particles, dried at from 50° to 80° C. and then passed between heated rollers under pressure (60° C.; nip pressure 200 kg/cm) to consolidate and smoothen the magnetic layer.

The magnetic properties were measured in a magnetic field of 160 kA/m. The remanence was 178 mT, and the orientation ratio, ie. the ratio of the residual induction in the playing direction to that in the crosswise direction, was 3.0. The film was slit into 3.81 mm wide tapes, and the electroacoustic properties were measured according to DIN 45,401, 45,403 and 45,512 (Sheet 12), against reference tape C 401 R. The results of the measurements are shown in Table 2.

EXAMPLE D

A solution of 53.1 g of toluylene diisocyanate and 75 g of diphenylmethyl diisocyanate in 229 g of tetrahydrofuran was heated at 60° C., and one drop of dibutyl-tin dilaurate was added. 250 g of an OH-containing polyester obtained from adipic acid and butane-1,4-diol and having a molecular weight of 1,000 and 27.7 g of hexanediol and 1.34 g of trimethylolpropane, dissolved in 200 g of tetrahydrofuran, were added to the above solution in the course of 2½ hours. After one hour, a further drop of dibutyl-tin dilaurate was added. After the NCO content had reached 1.05%, the mixture was cooled to 45° C. and 22.05 g of diethanolamine were then added. The resulting product had a solids content of 50%, and an OH number of 55 and a K value of 30.

EXAMPLE 4

The procedure described in Example 3 was followed, except that the polyurea-urethane described in Example C was replaced by the same amount of the one described in Example D.

The results of the measurements are shown in Table 2.

TABLE 2

|  | Example 3 | Example 4 |
|---|---|---|
| Layer thickness [μm] | 4.0 | 4.2 |
| Sensitivity at long wavelengths $E_T$ 315 Hz [ΔdB] | +1.5 | +1.7 |
| Sensitivity at short wavelengths $E_H$ 10 kHz [ΔdB] | +3.0 | +3.1 |
| Maximum output level at long wavelengths $A_T$ 315 Hz [ΔdB] | +3.1 | +3.3 |
| Maximum output level at short wavelengths $A_H$ 10 kHz [ΔdB] | +3.2 | +3.3 |

We claim:

1. A magnetic recording medium which comprises a magnetic layer which is applied to a non-magnetic base and consists essentially of a dispersion of an anisotropic magnetic material in an organic binder consisting essentially of an OH-containing polyurethane compound which is finally crosslinked with a polyisocyanate, wherein the OH-containing polyurethane compound is a thermoplastic polyurea-urethane which has an OH number of from 10 to 120 and a number average molecular weight of from 1,000 to 40,000 and is obtained by reacting IA. 1 mole of a polydiol having a molecular weight of from 400 to 4,000,
IB. from 0.2 to 10 moles of a diol of 2 to 18 carbon atoms,
IC. from 0.1 to 4 moles of a primary or secondary aminoalcohol of 2 to 20 carbon atoms, and
II. from 1.20 to 13 moles of a diisocyanate of 6 to 30 carbon atoms, the proportion of NCO groups in the diisocyanate being from 65 to 95%, based on Components IA to IC, of the equivalent amount of OH and NH groups, with the proviso that the non-pigmented finally crosslinked film has a tensile strength greater than 15 N/mm², an elongation at break greater than 30%, a modulus of elasticity greater than 150 N/mm² and a pendulum hardness of from 25 to 140 sec.

2. A magnetic recording medium as defined in claim 1, wherein the polyisocyanate-crosslinked polyurethane binder is the only binder in the magnetic layer.

3. A magnetic recording medium as defined in claim 1, wherein a portion of Component IB is replaced by a diamine of 2 to 15 carbon atoms.

4. A magnetic recording medium as defined in claim 1, wherein a portion of Component IB is replaced by a primary or secondary aminoalcohol of 2 to 20 carbon atoms.

5. A magnetic recording medium as defined in claim 1, wherein a portion of Component IB is replaced by water.

6. A magnetic recording medium which comprises a magnetic layer which is applied to a non-magnetic base and consists essentially of a dispersion of an anisotropic magnetic material in an organic binder consisting essentially of an OH-containing polyurethane compound which is finally crosslinked with a polyisocyanate, wherein the polyurethane is a thermoplastic polyureaurethane which has an OH number of from 10 to 120 and a number average molecular weight of from 1,000 to 40,000 and is obtained from IA. 1 mole of a polydiol having a molecular weight of from 400 to 4,000, IB. from 0.2 to 9 moles of a diol of 2 to 18 carbon atoms, IC. from 0.1 to 4 moles of a primary or secondary aminoalcohol of 2 to 20 carbon atoms, ID. from 0.01 to 1 mole of a triol of 3 to 18 carbon atoms, and II. from 1.25 to 13 moles of a diisocyanate of 6 to 30 carbon atoms, the proportion of NCO groups in the diisocyanate being from 65 to 95%, based on Components IA to ID, of the equivalent amount of OH and NH groups, with the proviso that the non-pigmented crosslinked film has a tensile strength greater than 15 $N/mm^2$, an elongation at break greater than 30%, a modulus of elasticity greater than 150 $N/mm^2$ and a pendulum hardness of from 25 to 140 sec.

7. A magnetic recording medium which comprises a magnetic layer which is applied to a non-magnetic base and consists of a dispersion of an anisotropic magnetic material in an organic binder consisting essentially of an OH-containing polyurethane compound which is finally crosslinked with a polyisocyanate, wherein the polyurethane compound is a thermoplastic polyureaurethane which has an OH number of from 10 to 120 and a number average weight of from 1,000 to 40,000 and is obtained from IA. 1 mole of a polydiol having a molecular weight of from 400 to 4,000, IB. from 0.2 to 9 moles of a diamine of 2 to 15 carbon atoms, IC. from 0.1 to 4 moles of a primary or secondary aminoalcohol of 2 to 20 carbon atoms, and II. from 1.20 to 13 moles of a diisocyanate of 6 to 30 carbon atoms, the proportion of NCO groups in the diisocyanate being from 65 to 95%, based on Components IA to IC, of the equivalent amount of OH and NH groups, with the proviso that the non-pigmented crosslinked film has a tensile strength greater than 15 $N/mm^2$, an elongation at break greater than 30%, a modulus of elasticity greater than 150 $N/mm^2$ and a pendulum hardness of from 25 to 140 sec.

8. A magnetic recording medium which comprises a magnetic layer which is applied to a non-magnetic base and consists of a dispersion of an anisotropic magnetic material in an organic binder consisting essentially of an OH-containing polyurethane compound which is finally crosslinked with a polyisocyanate, wherein the polyurethane compound is a thermoplastic polyureaurethane which has an OH number of from 10 to 120 and a number average molecular weight of from 1,000 to 40,000 and is obtained from IA. 1 mole of a polydiol having a molecular weight of from 400 to 4,000, IB. from 0.3 to 13 moles of a primary or secondary amino-alcohol of 2 to 20 carbon atoms, and II. from 1.20 to 13 moles of a diisocyanate of 6 to 30 carbon atoms, the proportion of NCO groups in the diisocyanate being from 65 to 95%, based on Components IA to IC, of the equivalent amount of OH and NH groups, with the proviso that the non-pigmented crosslinked film has a tensile strength greater than 15 $N/mm^2$, an elongation at break greater than 30%, a modulus of elasticity greater than 150 $N/mm^2$ and a pendulum hardness of from 25 to 140 sec.

9. A magnetic recording medium which comprises a magnetic layer which is applied to a non-magnetic base and consists of a dispersion of an anisotropic magnetic material in an organic binder consisting essentially of an OH-containing polyurethane compound which is finally crosslinked with a polyisocyanate, wherein the polyurethane compound is a thermoplastic polyureaurethane which has an OH number of from 10 to 120 and a number average molecular weight of from 1,000 to 40,000 and is obtained from IA. 1 mole of a polydiol having a molecular weight of from 400 to 4,000, IB. from 0.2 to 9 moles of water, IC. from 0.1 to 4 moles of a primary or secondary aminoalcohol of 2 to 20 carbon atoms, and II. from 1.20 to 13 moles of a diisocyanate of 6 to 30 carbon atoms, the proportion of NCO groups in the diisocyanate being from 65 to 95%, based on Components IA to IC, of the equivalent amount of OH and NH groups, with the proviso that the non-pigmented crosslinked film has a tensile strength greater than 15 $N/mm^2$, an elongation at break greater than 30%, a modulus of elasticity greater than 150 $N/mm^2$ and a pendulum hardness of from 25 to 140 sec.

* * * * *